(12) United States Patent
Callaway

(10) Patent No.: US 9,546,069 B2
(45) Date of Patent: Jan. 17, 2017

(54) DRIVE FOR ELECTROMECHANICAL CONTROL OF LINES

(71) Applicant: Microsoft Technology Licensing, LLC, Redmond, WA (US)

(72) Inventor: Allen Callaway, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 14/682,722

(22) Filed: Apr. 9, 2015

(65) Prior Publication Data

US 2016/0297639 A1 Oct. 13, 2016

(51) Int. Cl.
*F04D 15/00* (2006.01)
*H02K 7/14* (2006.01)
*B65H 51/30* (2006.01)

(52) U.S. Cl.
CPC .................... *B65H 51/30* (2013.01)

(58) Field of Classification Search
CPC ...... A63H 13/20; A63H 3/20; A63H 2200/00; A63H 5/00; A63H 13/00; A63H 13/02; A63H 3/00; A63H 3/14; A63H 3/16; A63H 3/18; A63H 3/28; A63J 19/006; A63J 19/00; G09F 19/02; G09F 19/08; A47F 8/00
USPC .......................... 318/3, 14, 15; 446/175, 359
See application file for complete search history.

(56) References Cited

U.S. PATENT DOCUMENTS

| | | | |
|---|---|---|---|
| 969,185 A * | 9/1910 | Pete | A63H 3/18 446/362 |
| 2,615,282 A | 10/1952 | Ueltschi | |
| 3,390,481 A | 7/1968 | Runanin | |
| 3,902,644 A * | 9/1975 | Bous | B65H 51/20 226/118.1 |
| 3,912,694 A * | 10/1975 | Chiappe | A63H 3/28 360/79 |
| 4,498,032 A * | 2/1985 | Pinson | F03C 1/053 310/24 |
| 4,690,655 A * | 9/1987 | Bailey | A63J 19/006 446/139 |
| 4,825,133 A | 4/1989 | Tanuma et al. | |

(Continued)

FOREIGN PATENT DOCUMENTS

EP 0707249 A2 4/1996

OTHER PUBLICATIONS

International Search Report, for PCT Application, PCT/US2016/026074, mail date: Jul. 18, 2016, 12 pages.

(Continued)

*Primary Examiner* — Paul Ip
(74) *Attorney, Agent, or Firm* — Dan Choi; Micky Minhas

(57) ABSTRACT

The claimed subject matter includes techniques for controlling lines. An example method includes receiving power at a motor to rotate a control surface and a line brace. The method also includes receiving programmed movements at a control circuit. The method further includes receiving a controlled force based on the programmed movements to arrange a skate in a predetermined position along a skate track in a skate surface. The method also includes rotating the control surface to cause a peg ramp on the control surface to move a peg in the skate towards a wedge fixed to a line. The method further includes causing the line to move to a new position along the direction of the skate track via a force of the peg against the wedge.

30 Claims, 15 Drawing Sheets

(56) References Cited

U.S. PATENT DOCUMENTS

| | | | | |
|---|---|---|---|---|
| 4,977,933 | A * | 12/1990 | Brais | D03D 37/00 139/15 |
| 5,254,029 | A * | 10/1993 | Myland | A63J 19/006 446/359 |
| 5,367,237 | A | 11/1994 | Ring et al. | |
| 5,642,757 | A * | 7/1997 | Froment | D03D 51/02 139/1 E |
| 5,796,620 | A | 8/1998 | Laskowski et al. | |
| 5,955,687 | A * | 9/1999 | Miyagi | G10F 1/06 84/97 |
| 6,297,941 | B1 | 10/2001 | Hoffmann et al. | |
| 6,378,960 | B1 | 4/2002 | Demmeler | |
| 6,582,273 | B2 * | 6/2003 | Chen | A63H 5/00 446/175 |
| 6,764,375 | B1 * | 7/2004 | Hsu | A63H 13/20 40/411 |
| 6,827,626 | B1 * | 12/2004 | Feeney | A63H 3/20 446/359 |
| 7,435,153 | B1 * | 10/2008 | Sodec, Jr. | A47F 8/00 446/295 |
| 7,911,165 | B2 | 3/2011 | Peyras et al. | |
| 7,928,834 | B2 * | 4/2011 | Schulze | A63H 3/20 340/286.01 |
| 8,070,446 | B2 | 12/2011 | Potter et al. | |
| 8,371,145 | B1 * | 2/2013 | Chen | |
| 8,626,415 | B2 | 1/2014 | Geyer et al. | |
| 2003/0087582 | A1 * | 5/2003 | Chen | A63H 5/00 446/175 |
| 2003/0216101 | A1 * | 11/2003 | Chang | A63J 19/00 446/84 |
| 2006/0276912 | A1 | 12/2006 | Pearce et al. | |
| 2008/0122647 | A1 * | 5/2008 | Schulze | A63H 3/20 340/815.58 |
| 2009/0197505 | A1 * | 8/2009 | Kitsugi | A63H 13/02 446/362 |
| 2009/0286450 | A1 * | 11/2009 | Gary | A63H 3/00 446/268 |
| 2010/0084517 | A1 | 4/2010 | Benson et al. | |
| 2010/0227526 | A1 * | 9/2010 | Wolff | G09F 19/08 446/359 |
| 2010/0227527 | A1 * | 9/2010 | Smoot | A63F 7/0088 446/362 |
| 2011/0071678 | A1 | 3/2011 | Ihrke et al. | |

OTHER PUBLICATIONS

Rahman, et al., "A Software Based Electric Actuator Control System With Robotic Arm—A Learning Aid for Undergraduate Students", In International Journal of General Engineering and Technology, vol. 2, Issue 1, Feb. 2013, 10 pages.

* cited by examiner

500A

500B

600

700

DRIVE FOR ELECTROMECHANICAL CONTROL OF LINES

BACKGROUND

A signal-driven device, such as a robotic device, generally relies on a plurality of actuators to move parts of the device. A signal may be received at each actuator, causing the actuator to convert electricity into movement of a particular part. The device can then be controlled via a series of signals to the actuators.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation provides a system for controlling a plurality of lines. The system can include a control surface mechanically coupled to a motor, the control surface having at least one ramp and at least one movement source. The system also can include a control circuit operatively coupled to the at least one movement source. The system further can include a skate surface adjacent to the control surface, the skate surface having a plurality of linear tracks, each of the plurality of tracks having one or more skates disposed therein, the one or more skates disposed to move along an associated track when driven by the control signals, the pegs of the one or more skates to move perpendicular to the skate surface when pushed by the ramp. The system can also further include a plurality of lines, each line tethered to one or more wedges, the pegs to cause one or more of the plurality of lines to move by engaging at least one wedge.

Another implementation provides method for controlling a plurality of lines. The method can include receiving power at a motor to rotate a control surface and a line brace. The method may also include receiving programmed movements at a control circuit. Further the method may include receiving a controlled force based on the programmed movements to arrange one or more skates in a predetermined position along a skate track in a skate surface. The method can further include rotating the control surface to cause a peg ramp on the control surface to move a peg in the one or more skates towards a wedge fixed to a line. The method can also further include causing the line to move to a new position along the direction of the skate track via a force of the peg against the wedge.

Another implementation provides a device for controlling a plurality of lines. The device can include a control surface mechanically coupled to a motor, the control surface having at least one peg ramp and at least one movement source arranged thereon. The device can also include a control circuit operatively coupled to the at least one movement source, the control circuit to receive programmed movements and provide the control signals to the movement source and the motor. The device can further include a skate surface adjacent to the control surface, the skate surface having a plurality of linear tracks, each of the plurality of tracks having one or more skates disposed therein, the one or more skates disposed to move along an associated track when driven by the control signals, the pegs of the one or more skates to move perpendicular to the skate surface when pushed by the peg ramp. The device can also further include a plurality of lines, each line tethered to a wedge, the pegs to cause one or more of the plurality of lines to move by engaging at least one wedge.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

This disclosure describes techniques to control a plurality of moving parts of a device via a plurality of lines that are centrally controlled at a control device. In some examples, the techniques described herein enable a scalable and parallel control of many moving parts. The present techniques provide the ability to control the many moving parts using relatively fewer actuators. Thus, the present techniques also provide the ability to create micro-scale devices capable of fine movement via the plurality of lines. A line, as used herein, refers to any form of cord, string, sheathed cable, and the like. The present techniques also provide the ability to dynamically control three-dimensional surfaces, among other applications. Furthermore, the techniques enable rapid prototyping using three dimensional surfaces controlled via the plurality of lines. For example, a dynamic mold can be controlled using the techniques described herein. In some examples, the techniques can be used to enable changing the shape of an airfoil in a wind tunnel.

Figure 1:
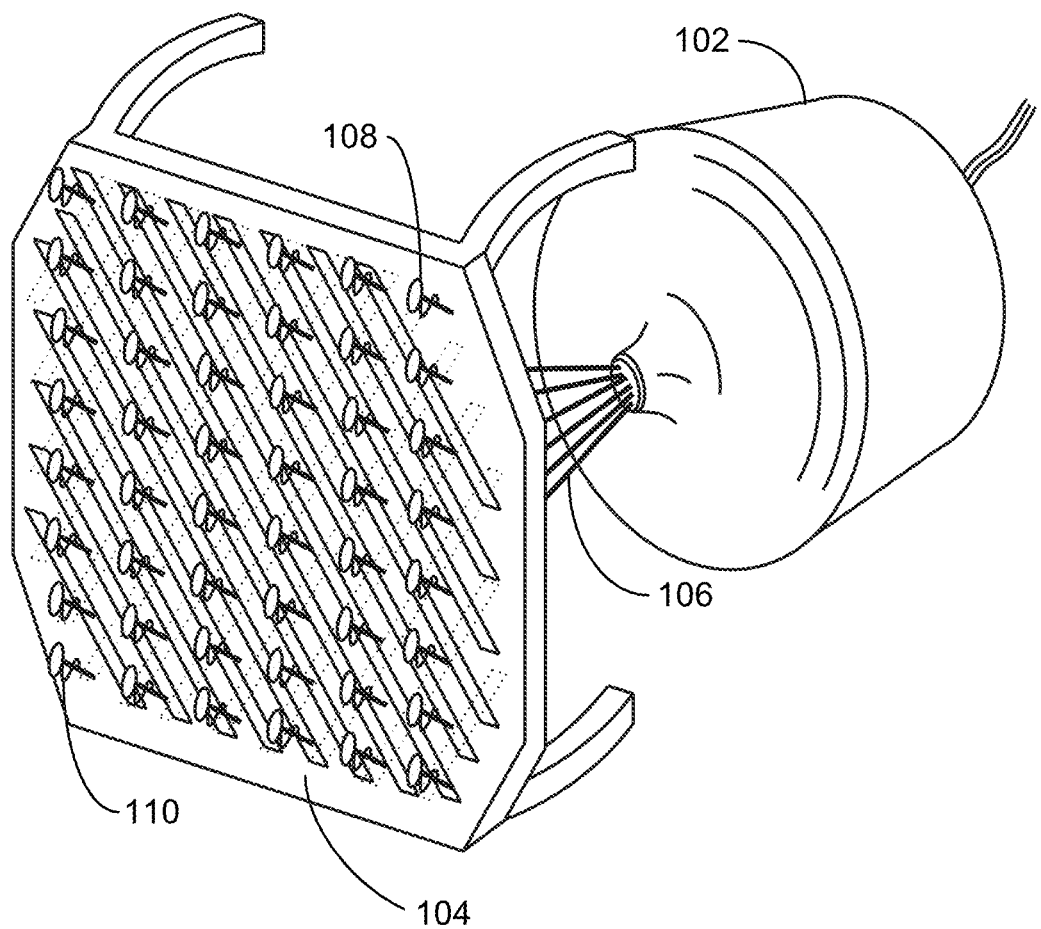
FIG. 1 is a block diagram of an example system implementing various aspects of the techniques described herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

FIG. 1 is a block diagram of an example system implementing various aspects of the techniques described herein. The example system is referred to generally by the reference number 100.

The example system 100 includes a drive 102 that is coupled to a grid 104 by a plurality of lines 106. The grid 104 includes a plurality of end effectors 108 that are offset from the grid 104 via springs 110. In some examples, the springs can be substituted with a resilient material, or omitted for endpoints that are controlled by two lines that operate in opposition to one another. The example grid 104 is composed of three layers of slots at 120 degrees to each other. In some examples, the slots 120 can be arranged at any suitable degree to each other. The grid 104 can also include any number of layers of slots. In some examples, the grid 104 can include two or more non-parallel layers of slots 120, or simply a flat surface with holes for the lines, depending on priorities for assembly and maintainability.

In the example system 100 of FIG. 1, the drive 102 controls a plurality of lines 106 that are tethered to and enable control of a plurality of end effectors 108. In some examples, the legs of grid 104 can be attached to the drive 102. The grid 104 contains a plurality of slots. For example, the grid 104 can have three sets of slots arranged at 120 degrees to one another. The bottom set of slots can be narrow slots that allow the lines 106 to pass through. In some examples, the top two sets of slots can be wider to support a resilient material in addition to the lines 106. For example, the resilient material can include ground up padding, among others. The lines 106 can pass out of the drive 102, through these layers of slots and terminate at an end effector 108 that could not pass through the bottom layer of slots. For example, the end effector 108 can be a bead. In some examples, the grid 104 with an array of positioned end effectors 108 can serve as an interface for an array of sensors attached to the lines 106.

In some examples, the end effectors 108 can be a tessellated array of pistons. A tessellated array of pistons, as used herein, is an arrangement of pistons that are nested among each other. For example, different shapes can be produced by manipulating the tessellated array of pistons via tension on the lines 106. In some examples, the end effectors 108 can be connected to end effectors of a second set of lines. For example, the second set of lines may be attached to movable parts of a second device to be controlled. For example, the movable parts may be various joints of a prosthetic arm or miniaturized object manipulator. In some examples, the movable parts may compose a medical device. In some examples, the second device may be a mold whose surface is attached to end effectors 108. For example, the shape of the mold can be dynamically controlled via movement of the end effectors 108. The end effectors 108 may be directly attached to a flexible and resilient material that may change shape as the lines exert force at various points on the material.

The diagram of FIG. 1 is not intended to indicate that the example system 100 is to include all of the components shown in FIG. 1. Rather, the example system 100 can include fewer or additional components not illustrated in FIG. 1 (e.g., additional lines 106, end effectors 108, springs 110, etc.).

Figure 2:
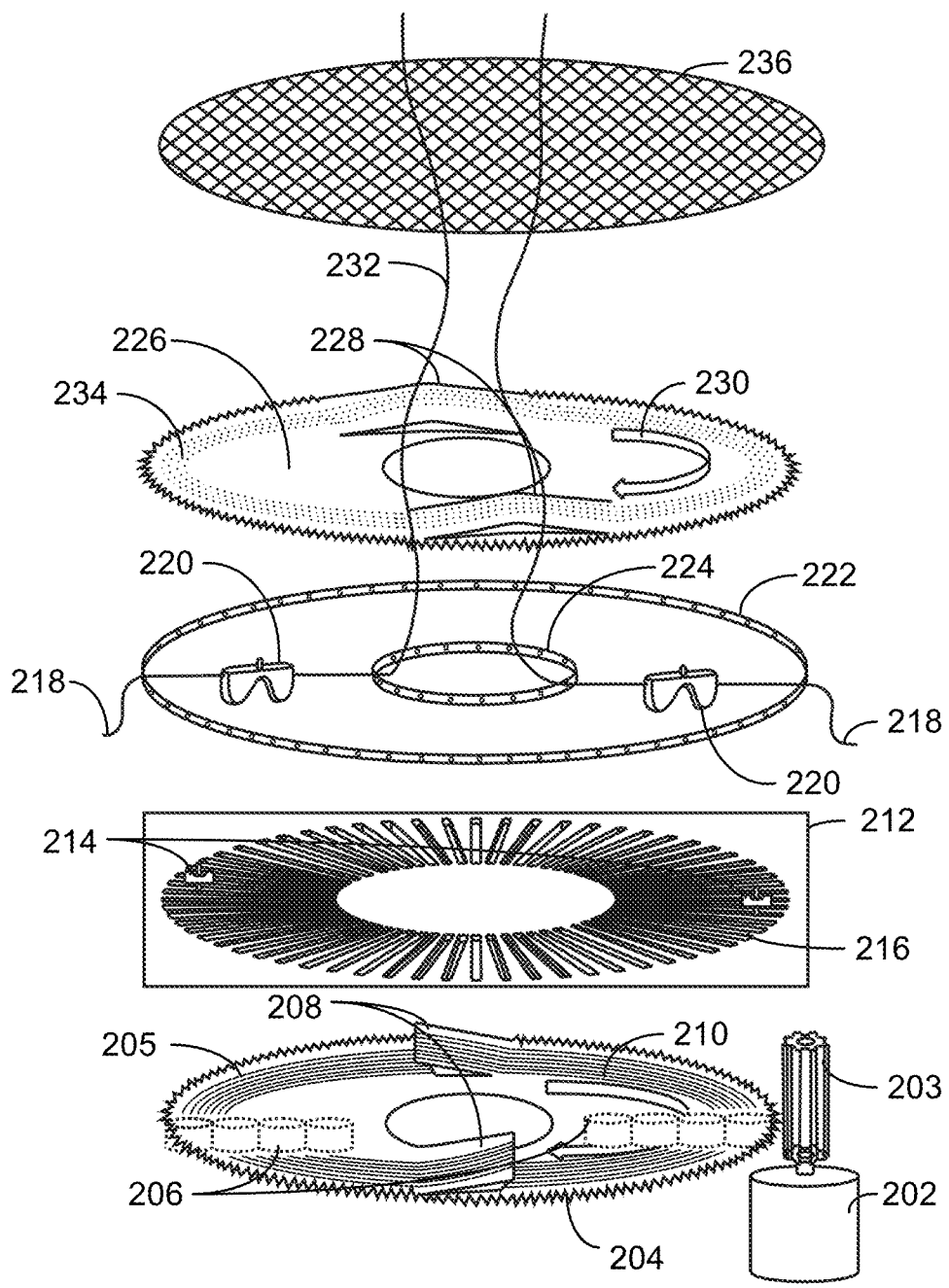
FIG. 2 is a detailed diagram of an example device for controlling a plurality of lines.

FIG. 2 is a detailed diagram of an example device for controlling a plurality of lines. The example device is generally referred to by the reference number 200. For example, the device 200 can be the drive 102 described in FIG. 1 above.

In the example device 200 of FIG. 2, a motor 202 is mechanically coupled to a circular control surface 204 and to the line brace 230. In some examples, the control surface 204 and line brace 230 move at the same speed and remain in a fixed position relative to each other. The control surface 204 with toothed edges has grooves 205 and one or more sets of electromagnets 206 that are radially aligned on the control surface 204. As used herein, radially refers to being arranged along lines diverging along the radius of a circular surface from a common center, such as a thrust roller bearing. The grooves 205 can be a set of concentric circles that do not exist above the electromagnets 206. The control surface 204 also includes one or more peg ramps 208 alternately situated with the electromagnets 206 and having positive slopes in the counterclockwise direction. An arrow 210 indicates a clockwise direction in which the example control surface 204 rotates. In some examples, the control surface 204 can rotate in the opposite direction. Adjacent and parallel to the control surface 204 is a skate surface 212.

The skate surface 212 contains one or more skates 214 having pegs displaced therein. Each skate 214 is trapped within a slot 216 in such a way that it can slide radially but cannot otherwise move freely. Above and parallel to the skate surface 212, a plurality of lines 218 have wedges 220 fixed thereon. In some examples, the number of pegs, wedges 220 and lines 218 can be equal in number. The lines each pass through an outer line ring 222 and an inner line ring 224 which holds the lines in position relative to the pegs and lead up to a line brace 226. In some examples, additional framework, such as another slotted surface, may be added if necessary to restrict the movement of the wedges. The line brace 226 includes one or more wedge ramps 228 that are in a fixed position relative to the peg ramps 208. The line brace 226 also includes toothed edges or any similar mechanism to drive it in tandem with the control surface 204. Another arrow 230 indicates the clockwise direction of rotation for the line brace 226. The line brace 226 has a concentric grooved surface with a plurality of grooves 234. A groove as used herein refers to a cavity shaped to fit a peg or protrusion. The load end 232 of lines 218 lead up through the brace and into grid 236. The load end 232, as used here, refers to the portion of lines 218 having tension.

In FIG. 2, the motor 202 receives signals from a control circuitry (not shown) and can rotate at a consistent, fixed speed. The gears of the motor 202 are coupled to the toothed control surface 204 to enable the control surface 204 to rotate in a direction at a predetermined rate. For example, the control surface 204 can be a circular plate with toothed edges that rotates clockwise about a center. In some examples, a sensor can monitor the position of the control surface relative to the skate surface. If the control surface slows down, the control circuit can adjust the timing of the rotation based on the detected change in rotation speed. In some examples, the control circuit can alter the speed of the motor mechanically coupled to the control surface.

In addition, the control circuitry can send signals to the electromagnets 206 to cause the skates 214 to move as the control surface causes the electromagnets 206 to pass beneath the skates 214. For example, the skates 214 may include a magnetic or ferromagnetic material that responds to magnetic forces as discussed in greater detail with respect to FIG. 4 below. As the control surface 204 is driven by the motor 202, the peg ramps 208 cause pegs in the skates 214 to move up and down through holes in the skates 214. In some examples, as the pegs of skates 214 are pushed up by the peg ramps 208, the pegs can engage the wedges 220. In some examples, the pegs and skates can be forced to move by other means. For example, fluid pressure, pellets, or any other suitable mechanism for moving the pegs and skates can be used. Each peg can push into a wedge and thereby cause the wedge and the wedge's associated line to move such that the center of the wedge is moved towards the radial position of the peg. The movement of a wedge also causes the movement of the line to which the wedge is respectively attached. Thus, in the example device of 200, the movement of a line 218 can be half the wedge for a half rotation or the length of the wedge for a full rotation of the control surface 204 given two peg ramps 208. In some examples, the movement of the line 218 can be increased with the use of additional ramps. Thus, for one rotation, the movement can be half the length of the wedge 220 multiplied by the number of peg ramps 208. Before and after the wedge is engaged by the peg of a skate 214, the line brace 226 holds the load end 232 of lines 218 in place. For example, the rotation of line brace 226 can cause wedge ramps 228 to release each respective line 218 as each line's corresponding wedge 220 is engaged by a peg of a corresponding skate 214. In this manner, the load end 232 of lines 218 can be displaced back and forth through grid 236. As shown above in FIG. 1, the movement of the lines 218 can be used to control various moving parts of a device accordingly.

The diagram of FIG. 2 is not intended to indicate that the example device 200 is to include all of the components shown in FIG. 2. Rather, the example device 200 can include fewer or additional components not illustrated in FIG. 2 (e.g., additional electromagnets 206, peg ramps 208, skates 214, slots 216, lines 218, etc.).

Figure 3:
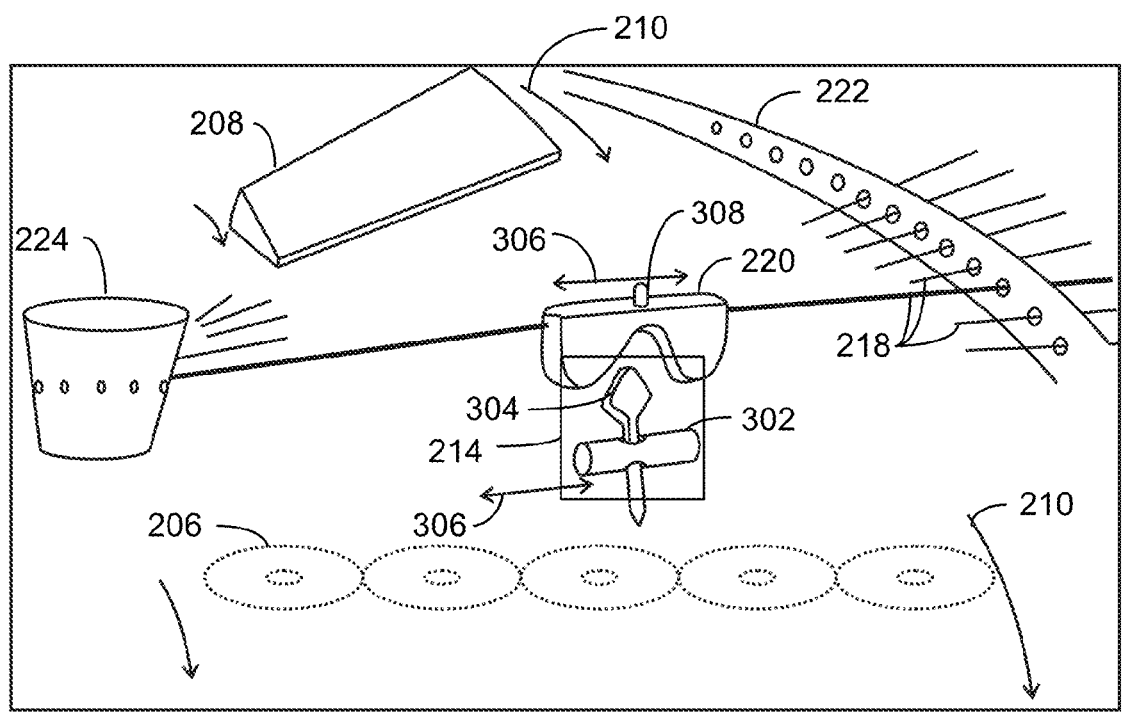
FIG. 3 is a detailed diagram of an example peg being electromagnetically displaced.

FIG. 3 is a detailed diagram of an example peg being electromagnetically displaced. The example device of FIG. 3 is generally referred to by the reference number 300.

In the example device 300 of FIG. 3, the skate and peg combination 214 includes a skate 302 with a hole or notch through the skate 302 and a peg 304 that is inserted into the hole of skate 302 so that a portion of the peg 304 extends from each side of the hole. Peg 304 is shown with a widened head that may be effective when applying force against the wedge 220, but, in some examples, a simpler or different shape may also work depending on scale and design. Beneath the skate and peg 214 is a set of electromagnets 206 that are fixed to a control surface (not shown). Above the skate and peg combination 214 is a wedge 220 fixed to a line 218 that is one of a set of lines 218 coming from the outer line ring 222 through the inner line ring 224. A peg ramp 208 is also fixed to the control surface (not shown) moving in the same clockwise direction 210 as the electromagnets 206. In some examples, the control surface can move in a counter-clockwise direction provided that the peg ramps 208 are positioned so that the thickness of the peg ramp 208 increases in a clockwise direction.

In the example device 300, the peg and skate combination 214 and wedge 220 can both move in a radial direction 306 according to signals received by the electromagnets 206. For example, one or more of the electromagnets 206 may receive a current and cause the ferromagnetic skate 302 of the peg and skate combination 214 to move in a particular direction 306 along a radius of the control surface. In some examples, the skate 302 can be a supermagnet as described in detail in FIG. 4 below. A supermagnet, as used herein, refers to a rare-earth, permanent magnet also known as a neodymium magnet. In some examples, the skate 302 can be a non-magnetic ferrous material or a weak magnetic material. The skate 302 is thereby displaced by the electromagnets 206 into a particular position. After the skate 302 is moved into the particular position, the peg ramp 208 then pushes the peg 304 in the vertical direction to engage the wedge 220. A vertical direction or horizontal direction, as used herein, are relative terms. For example, the example device 300 can operate in any orientation or at any tilt with respect to the direction of gravity and is not limited to operating in the orientation (i.e., up or down) as depicted in FIG. 3. The engaging of the wedge 220 by the peg 304 can cause the wedge to also move in a radial direction depending on the placement of the peg 304. For example, if peg 304 was placed by electromagnets 206 under the direct center of wedge 220, then wedge 220 would not be displaced in either direction. However, if the peg 304 was displaced a distance of less than half the length of the wedge 304 in either radial direction, then the peg 304 will cause the wedge 220 to move in the same direction and by the same amount of displacement as the peg ramp 208 pushes the peg 304 into the wedge 220. In some examples, the wedge 220 can also have a protrusion 308 on top that can engage grooves on the bottom of a line brace (not shown) when the wedge 220 is not engaging the peg and skate 214.

It is to be understood that the diagram of FIG. 3 is not intended to indicate that the example device 300 is to include all of the components shown in FIG. 3. Rather, the example device 300 can include fewer or additional components not illustrated in FIG. 3 (e.g., additional electromagnets 206, peg ramps 208, skate and peg combinations 214, lines 218, wedges 220, etc.).

Figure 4:
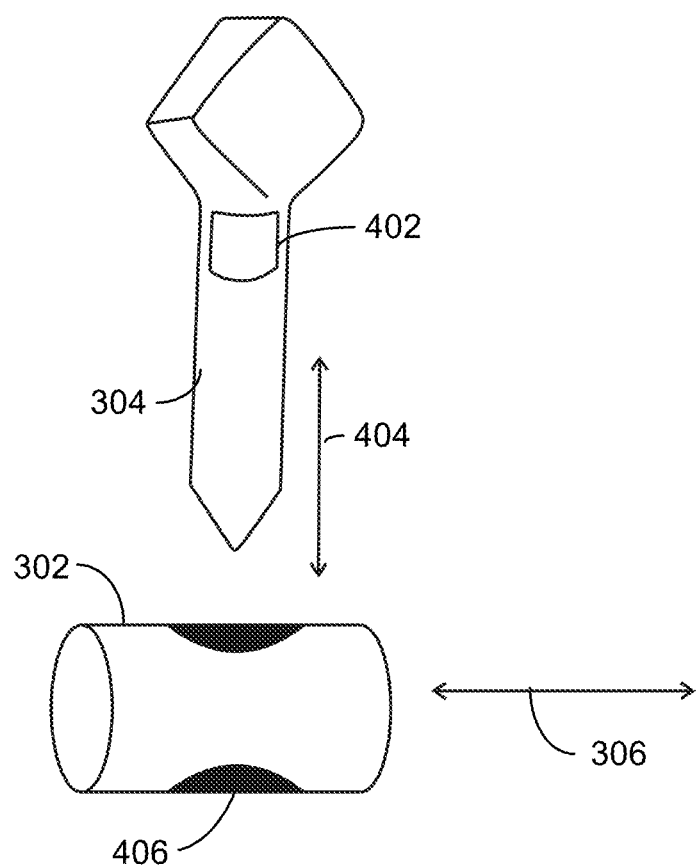
FIG. 4 is a detailed diagram of an example peg and skate.

FIG. 4 is a detailed diagram of an example peg and skate. The example peg and skate combination is generally referred to by the reference number 214.

In the example peg and skate combination 214, the peg 304 contains a magnet 402. In some examples, the peg 304 can contain a magnetic or ferrous material 402 to aid in centering the peg 304 when it is not being forced by a ramp. The skate contains a hole or notch 406. Two lines of direction are indicated by arrows 404 and 306.

In the example of FIG. 4, the peg 304 can move up and down through the hole 406 of the skate 302 along the direction indicated by arrow 404. The material 402 of peg 304 is magnetically attracted to the skate 302. In some examples, the skate 302 can be made of any ferromagnetic material. For example, the skate 302 can be a supermagnet. If the skate is a magnet then material 402 can be ferrous material. Likewise, if the skate is ferrous, then the material 402 can be magnetic. Thus, the peg 304 can be moved in the direction indicated by arrow 404 by peg ramps 208, and then attracted in an opposite direction towards the skate 302 via magnetic attraction. The skate 302 is moved in the radial direction 306 via magnetic forces from the electromagnets (not shown).

It is to be understood that the diagram of FIG. 4 is not intended to indicate that the example peg and skate combination 214 is to include all of the components shown in FIG. 4. Rather, the example peg and skate combination 214 can include fewer or additional components not illustrated in FIG. 4 (e.g., additional electromagnets 206, peg ramps 208, skates 214, slots 216, lines 218, etc.).

Figure 5A:
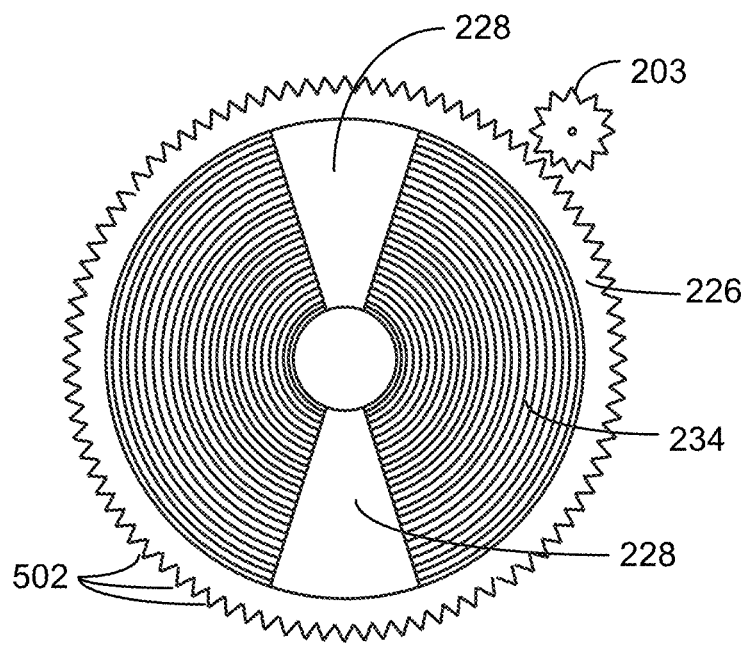
FIG. 5A is a bottom-up view of an example line brace.

FIG. 5A is a bottom-up view of an example line brace. The example brace of FIG. 5A is generally referred to by the reference number 500A and explained with reference to FIG. 2.

In the example line brace 500A, the bottom side of line brace 500A is shown with a plurality of grooves 234, a pair of wedge ramps 228, and a plurality of toothed edges 502. A gear 203 is shown engaging the toothed edges 502 of the example line brace 500A.

As seen in example line brace 500A, the gear 203 of a motor (not shown) can engage the toothed edges 502 of the example line brace 500A and cause the example brace 500A to rotate. A wedge 220 (as shown in FIG. 2) can move radially when under the wedge ramps 228 and is radially coupled in the grooves 234 when under the grooves 234. For example, the wedge 220 can have a protrusion on top that is shaped to fit in the grooves 234. The wedge ramps 228 enable the wedge 220 of FIG. 2 to be repositioned by the electromagnets 206 (shown in FIG. 2) as the wedge ramps 228 pass over the wedge and the wedge decouples from the grooves.

The diagram of FIG. 5A is not intended to indicate that the example line brace 500A is to include all of the components shown in FIG. 5A. Rather, the example line brace 500A can include fewer or additional components not illustrated in FIG. 5A (e.g., additional gears 203, grooves 234, wedge ramps 228, toothed edges 502, etc.).

Figure 5B:
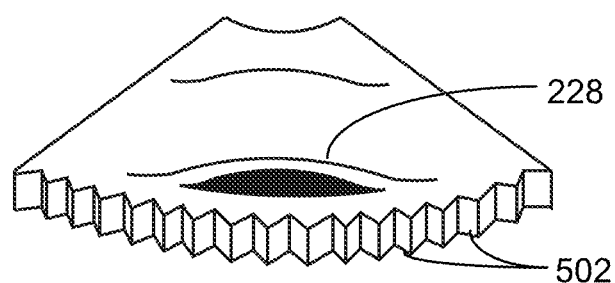
FIG. 5B is a side view of an example line brace.

FIG. 5B is a side view of an example brace. The example line brace of FIG. 5B is generally referred to by the reference number 500B.

In the example line brace of 500B, the side of line brace 500B is shown with a wedge ramp 228, and a plurality of toothed edges 502. A portion of line brace 500B is shown rather than the entire line brace 500B for convenience.

As seen in example line brace 500B, the wedge ramp 228 is a portion of the line brace 500B that is convex on top of line brace 500B and concave on the bottom of line brace 500B. The toothed edges 502 as shown from the side are shaped and sized to fit the teeth of a corresponding gear (not shown).

The diagram of FIG. 5B is not intended to indicate that the example line brace 500B is to include all of the components shown in FIG. 5B. Rather, the example line brace 500B can include fewer or additional components not illustrated in FIG. 5B (e.g., additional wedge ramps 228, toothed edges 502, etc.).

Figure 6:
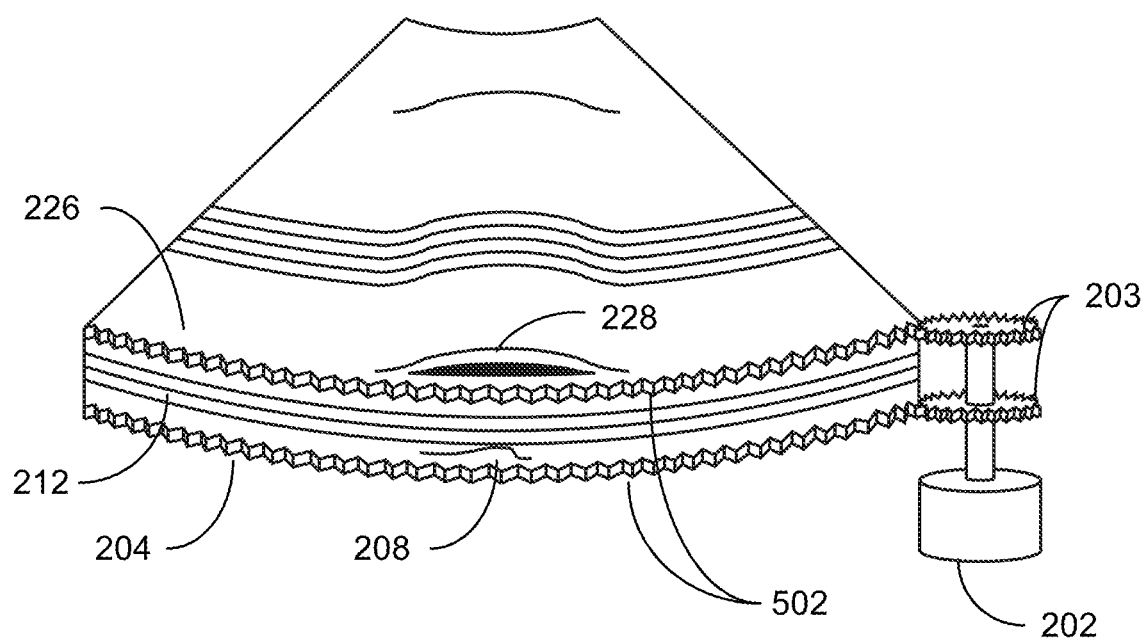
FIG. 6 is a side view of an example motor engaging an example brace and example control surface.

FIG. 6 is a side view of an example motor engaging an example brace and example control surface. The example device of FIG. 6 is generally referred to by the reference number 600 and is discussed with reference to FIG. 3.

In the example of FIG. 6, a line brace 226, a skate surface 212 and a control surface 204 are oriented about a common center 502. In some examples, the line brace 226 can be held in place by a bearing on the outer frame (not shown) of the example device 600. The line brace 226 has a wedge ramp 228 and the control surface 204 has a peg ramp 208. A peak of peg ramp 208 is aligned radially with the peak of wedge ramp 228. The line brace 226 and control surface 204 also have toothed edges 502.

In the example device 600, the control surface 204 and the line brace 226 can be rotated about a common center 502 via one or more gears (203) attached to a motor (202). In some examples, the control surface 204, skate surface 212, and the line brace 226 can be radially symmetrical surfaces to be located adjacent to one another. The size and shape of toothed edges 502 can be constructed such that the peak of wedge ramp 228 of the line brace 226 maintains alignment with the peak of the peg ramp 208 of the control surface 204. In some examples, as the control surface 204 and the line brace 226 are rotated in the same direction, a peg (not shown) can be engaged by the peg ramp 208 while a wedge (not shown) is decoupled from grooves 234 on the underside of line brace 226 via wedge ramp 228. The peg can then cause the wedge to move as discussed above in FIGS. 3 and 4. The wedge can then be coupled again to the grooves of line brace 226 as wedge ramp 228 finishes passing over the wedge. The peg (not shown) can then be moved to a new position by the interaction of the skate (not shown) in which the peg is in with electromagnets (not shown) in the control surface 204.

The diagram of FIG. 6 is not intended to indicate that the example grid 600 is to include all of the components shown in FIG. 6. Rather, the example grid 600 can include fewer or additional components not illustrated in FIG. 6 (e.g., additional peg ramps 208, 228, toothed edges 502, etc.).

Figure 7:
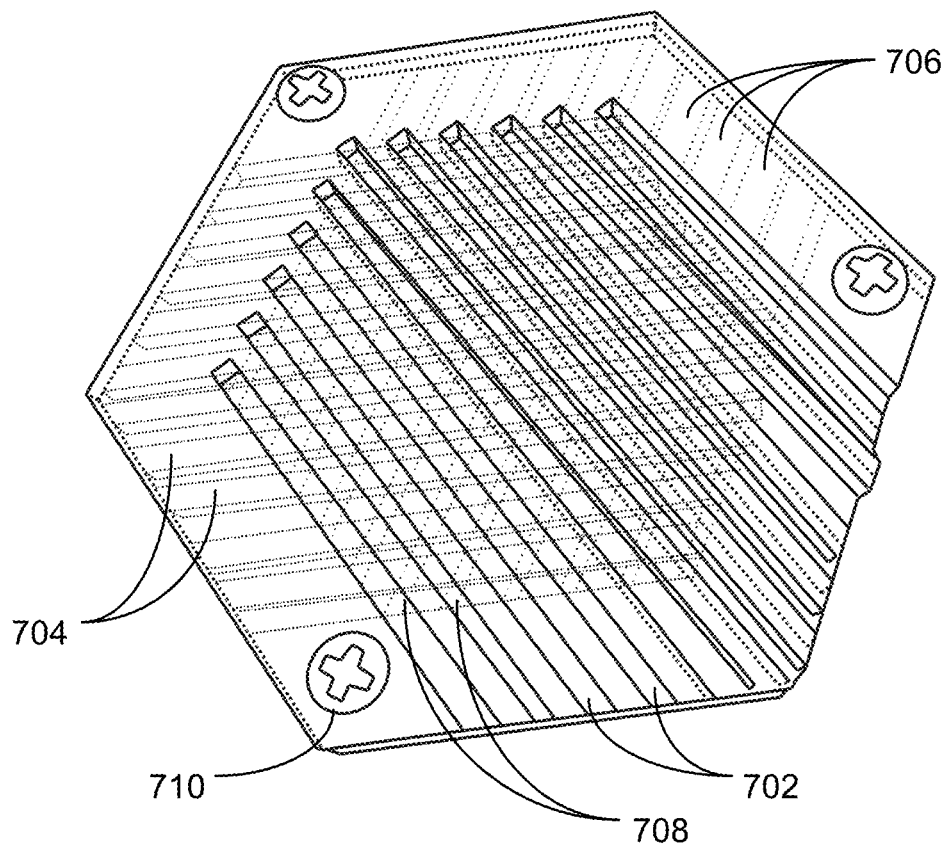
FIG. 7 is a top view of an example grid according to embodiments herein.

FIG. 7 is a top view of an example grid according to embodiments herein. The example grid of FIG. 7 is generally referred to by the reference number 700.

In the example grid 700, three layers 702, 704, 706 of hexagonal surfaces with slots are shown producing holes 708 where the three sets of slots overlap. The three layers 702, 704, 706 are shown held together by three screws 710.

In the example of FIG. 7, the grid 700 can be any static surface with holes that does not move relative to the device's frame. In some examples, the grid 700 can be built-in to the device or bolted-on to the device. The grid 700 can keep the lines organized and prevent entanglements and knotting of the lines. As the lines get smaller and denser it becomes more important to keep them organized and prevent tangles. As the lines get more numerous it becomes more attractive to easily attach or detach end effectors to the lines. An end effector, as used herein, refers to a device that responds to a movement of an attached line. If the drive controls a small number of lines, and the lines are permanently attached to a single device, then the grid can be removed from the device. For example, a device with a small number of lines below a threshold amount that are attached to a molded foam can be constructed without the use of a grid 700. In some examples, the grid 700 can additionally function as an interface. For example, a bead can be attached on the line that passes through the grid. The bead can function like a hitch ball for a component to be attached via a hitch or similar connection. In some examples, a resilient material can be inserted between the grid 700 and the bead so that the end effector could reposition itself when the line produces slack. Thus, the number of necessary lines can be halved, but the force necessary to move the line is increased. In some examples, an end effector can be manipulated by two or more lines that move in opposition to one another, rather than by a single line with resilient material to offer a fixed amount of counter-resistance. The opposing lines may be effective in cases where the force exerted on a line by a load would exceed the force that could be applied by the motion of the pegs.

The diagram of FIG. 7 is not intended to indicate that the example grid 700 is to include all of the components shown in FIG. 7. Rather, the example grid 700 can include fewer or additional components not illustrated in FIG. 7 (e.g., additional layers 702, holes 708, screws 710, etc.).

Figure 8:
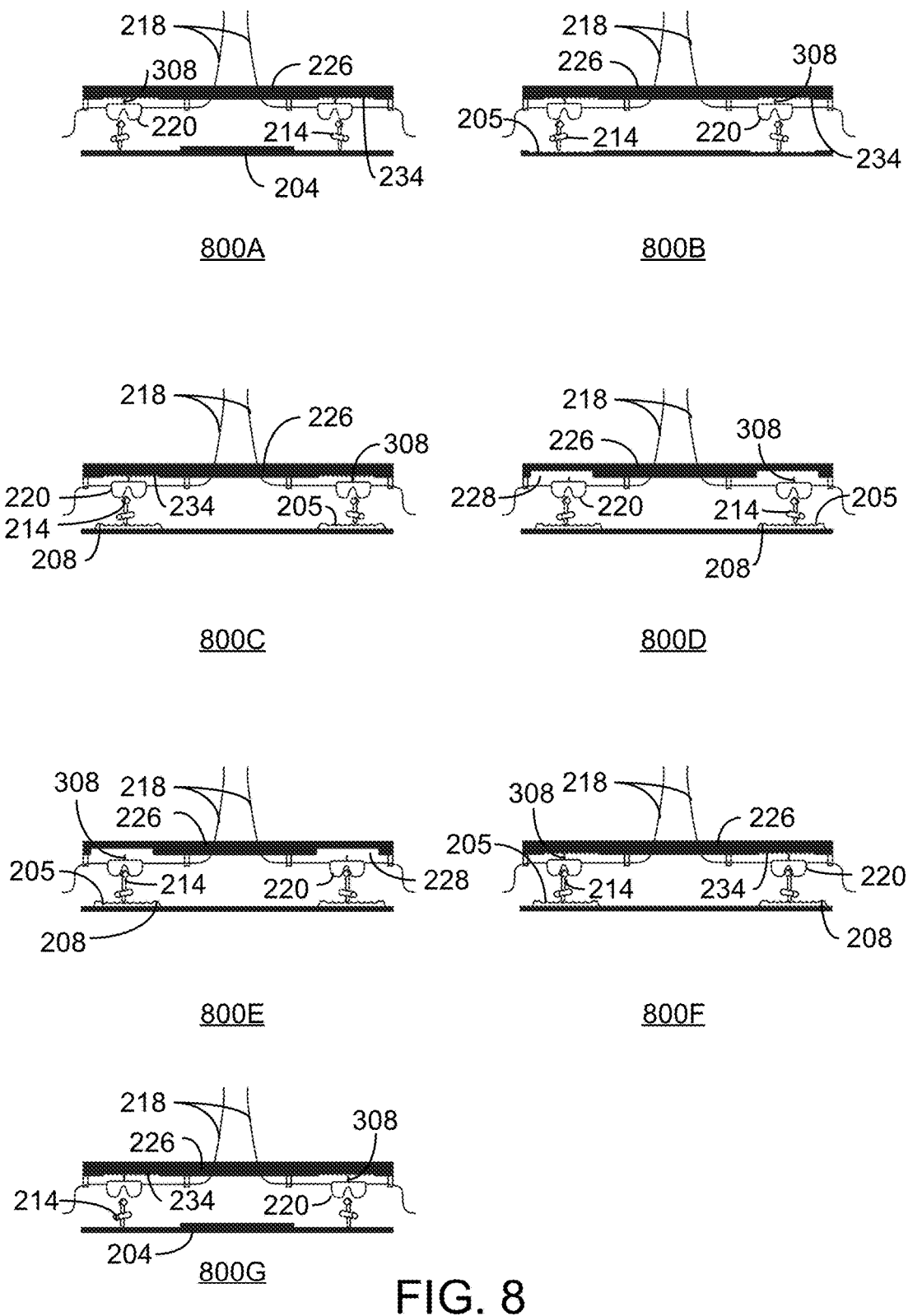
FIG. 8 is a set of diagrams represented as FIGS. 8A-8G showing a method for controlling a plurality of lines.

FIG. 8 is a set of diagrams of a method for controlling a plurality of lines. The diagrams are generally referred to by the reference numbers 800A-800G.

In the example of 800A, a plurality of lines 218 with wedges 220 with protrusions 308 are shown braced by a line brace 226 with grooves 234. The peg and skate combinations 214 are directly below the lines and braces. The peg and skate combinations 214 are electromagnetically moved into new positions by electromagnets (not shown). In some examples, the peg and skate combinations 214 can be magnetic and thus attracted to the electromagnets. The line brace 226 can hold the wedges 220 of lines 218 in place as the pegs are moved to their new positions. For example, protrusions 308 in the wedges 220 may be coupled to grooves 234 in the line brace 226. In the example of 800A, the peg and skate combinations 214 are free to slide about the control surface 204. For example, the electromagnets (not shown) may be attached on the underside of the control surface 204.

In the example of 800B, a plurality of grooves 205 are shown holding peg and skate combinations 214 in place. In this example, after the peg and skate combinations 214 have been positioned, the pegs can then be held in place by grooves 205 on the control surface 204. The grooves 205 can prevent the peg and skate combinations 214 from moving radially after being positioned by the electromagnets in example 800A.

In the example of 800C, two peg ramps 208 are shown pushing pegs in the peg and skate combinations 214 towards the wedges 220 attached to the lines 218. In this example, the pegs of the peg and skate combinations 214 can begin to push on the wedges 220, causing lines 218 to move such that the center of the wedges 220 move to align with the center of the peg and skate combinations 214. The wedges 220 are still coupled to the grooves 234 of the line brace 226 via protrusions 308. In some examples, the peg ramps 208 can include grooves that match the grooves 205 of the control surface.

In the example of 800D, the line brace 226 is shown with a cross section of wedge ramp 228. In this example, the line brace 226 has been deactivated to allow the lines 218 to move in the direction of their attached wedges 220. For example, the line brace 226 can be deactivated via the wedge ramp 228 that causes the line brace 226 to decouple from the wedges 220 of the lines 218. As the wedge ramp 228 passes over the wedges 220, the protrusions of the wedges 220 may no longer be coupled to the grooves of the line brace 226. The pegs 304 can also be pushed further up against the wedges 220 by the peg ramps 208.

In the example of 800E, the pegs of peg and skate combinations 214 are shown fully engaged with the wedges 220 of lines 218. The pegs of peg and skate combinations 214 are thus fully pushed into the wedges 220 by the peg ramps 208, which are at their peak height. The centers of the wedges 220 are then aligned with the center of peg and skate combinations 214. The movement of the lines 218 further causes movement of the end effectors (not shown). In some examples, movement of the end effectors can cause corresponding end effectors to move parts of an object to be controlled. The wedges 220 are still decoupled from the line brace 226 in example 800E.

In the example of 800F, the line brace 226 is shown engaging the lines 218 once again. In this example, the line brace 226 has been reactivated after the wedges 220 of lines 218 have fully locked into place with the peg and skate combinations 214. The wedge ramps of line braces 226 may recouple the grooves 234 of line braces 226 to the wedges 220 attached to lines 218. For example, as the wedge ramp finishes passing over the wedges 220, the grooves 234 of the line braces 226 can again be coupled to the protrusions 308 of the wedges 220.

In example 800G, the peg ramps have completed their pass under peg and skate combinations 214. The wedges 220 are now in a new position as compared to example 800A, but held by the grooves 234 of line brace 226 as in example 800A. After the line brace 226 reengages the lines 218 via the protrusions 308 of wedges 220, the moving peg ramps 208 cease to push against the peg and skate combinations 214 as they complete passing under the peg and skate combinations 214. The peg and skate combinations 214 can thus be repositioned by the electromagnets (not shown) as in example 800A. In some examples, the pegs may return to their initial positions within the skates in the peg and skate combinations 214 via a magnetic attraction to the skates that the pegs slide through as described in detail in FIG. 4 above. In some examples, the pegs may remain loose at any position inside the skate's hole.

The diagram of FIG. 8 is not intended to indicate that the example devices 800A-800G are to include all of the components shown in FIG. 8. Rather, the example devices 800A-800G can include fewer or additional components not illustrated in FIG. 8 (e.g., peg ramps 208, peg and skate combinations 214, slots 216, lines 218, grooves 205, etc.).

Figure 9:
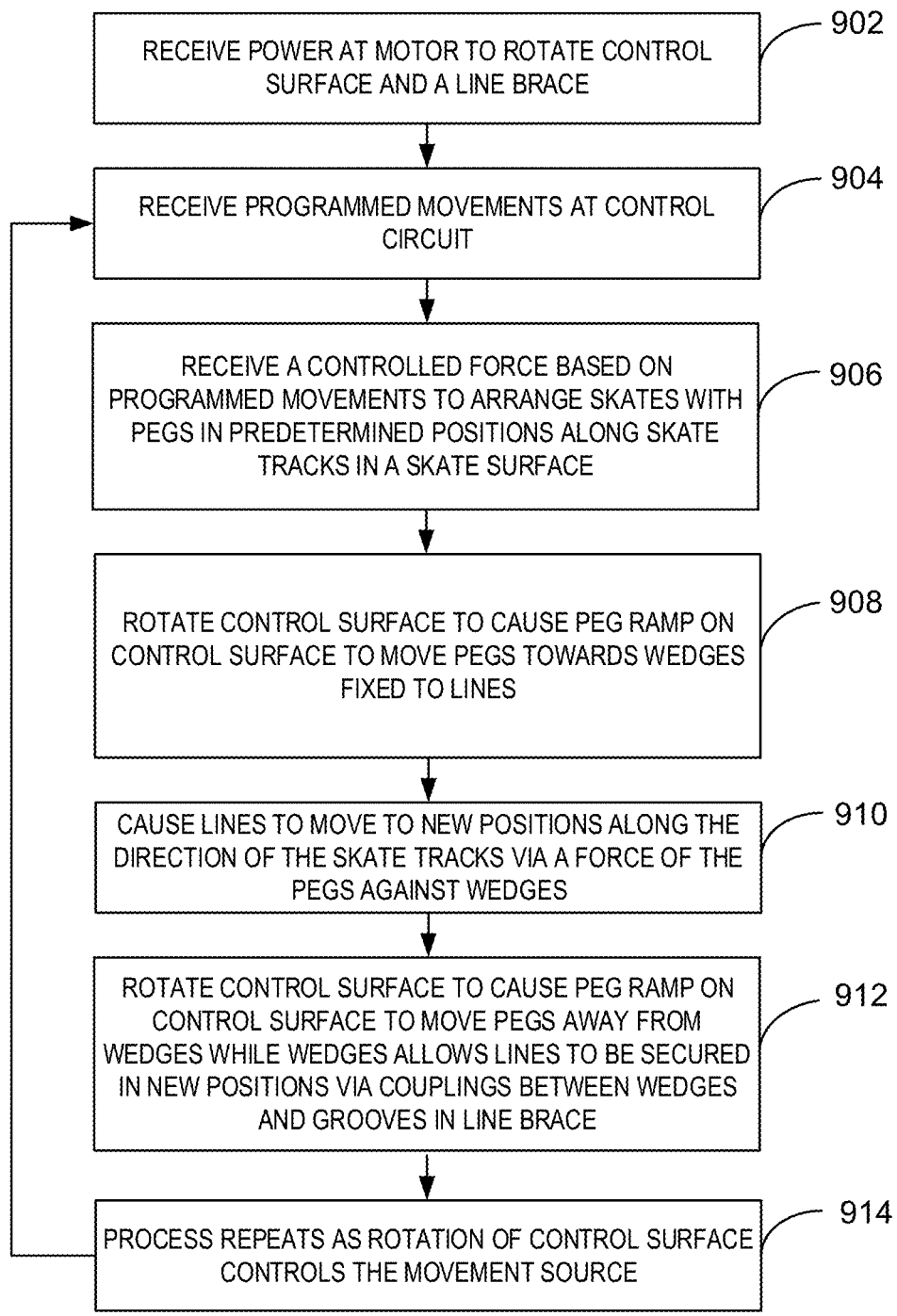
FIG. 9 is a process flow diagram of a method for controlling a plurality of lines.

FIG. 9 is a process flow diagram of a method for controlling a plurality of lines. The example method is generally referred to by the reference number 900 and discussed with reference to the example devices 200 of FIG. 2 and 300 of FIG. 3.

At block 902, the motor 202 receives power to rotate a control surface 204 and a line brace 226. As discussed with regard to FIG. 2, the line brace can be a surface with a plurality of grooves 234 that can hold wedges 220 in place. For example, the grooves 234 can be concentric grooves 234 in a circular line brace 226 that hold the wedges 220 from moving radially. In some examples, the motor 202 can rotate the control surface 204 at predetermined angular speeds. In some examples, the power can be adjusted to keep the angular speed constant. For example, the friction between peg ramps 208 and pegs 304, and between the wedge ramps 228 and wedges 220, may cause more power to be used to keep the control surface 204 rotating at the same angular speed.

At block 904, a control circuit can receive programmed movements. For example, the control circuit can be within the drive 102. The programmed movements can come from many sources. For example, a cloud computing solution can be used to set up a distributed control system where a device is collaboratively controlled by onboard logic, server-side logic and user input. Furthermore, machine learning can be utilized to continually automate operation. In some examples, the programmed movements can correspond to the movements of a complex device with numerous moving parts. For example, the lines can be connected to a plurality of end effectors in the complex device that cause the numerous moving parts to move.

At block 906, the movement source can receive a controlled force based on programmed movements to arrange skates 302 with pegs 304 in predetermined positions along skate tracks 216 in a skate surface 212. For example, the movement source can be a set of electromagnets. In some examples, the movement source can include fluid pressure, pellets, or any other suitable mechanism for moving the pegs and skates. The skates 302 can also be made of any magnetic or ferrous material. For example, the skates 302 can be supermagnets. The voltages of the electromagnets 206 can be used to alter the magnetic field when the electromagnets 206 spin under the skates 302. In some examples, the control circuit can modulate electromagnetic pulses as the electromagnets 206 pass under the skates 216. The skates 302 can then slide into a position based on an interaction of the skate 302 with the magnetic field. In some examples, the pegs 304 in skates 302 can then be coupled to a plurality of grooves in the control surface to hold the skates 302 in place. For example, the grooves can be a set of concentric grooves that can keep the skates 302 from moving radially back and forth in the skate tracks 216.

At block 908, the motor 202 can rotate the control surface 204 to cause a peg ramp 208 on the control surface 204 to move one or more pegs 304 towards wedges 220 permanently attached to lines 218 while a wedge ramp 228 on a line brace 226 moves away from the wedges 220 attached to lines 218. For example, the peg ramps 208, 228 can be aligned and spinning with the same rotation, such that the wedges 220 are released from the line brace 226 as the wedges 220 are engaged by the pegs 304.

At block 910, the force of a peg 304 sliding against a wedge 220 causes an attached line 218 to move parallel to a skate track 216 associated with the peg 304. For example, the shape of the wedge 220 can allow the peg 304 to slide towards the center of the wedge 220, the wedge 220 moving in the direction of the peg 304.

At block 912, the motor 202 can rotate the control surface 204 to cause a peg ramp 208 on the control surface 204 to move pegs 304 away from wedges 220 while a wedge ramp 228 allows wedges 220 attached to lines 218 to be secured in new positions. For example, the motor 202 can rotate the line brace 226 including the wedge ramp 228 such that the wedges 220 are coupled to via grooves 234 in the line brace 226 as the wedge ramp 228 comes down from a peak.

At block 914, the process repeats as rotation of the control surface controls the movement source. For example, blocks 904 through 912 can be repeated until the lines are in predetermined positions. In some examples, blocks 904 through 912 can be repeated continuously for the appearance of a continuous movement of the lines. For example, a visual display may be depicted in three dimensions on a surface of tessellated pistons using the techniques described above. In some examples, the control circuit can measure the position of the control surface relative to the skate surface using a sensor and adjust the power of the motor to keep an angular speed of the control surface and line brace constant. In some examples, the control circuit can predict the change in speed to provide additional power to keep the angular speed constant. In some examples, the control circuit can or assume that the speed is constant and apply a constant voltage to the motor.

Figure 10:
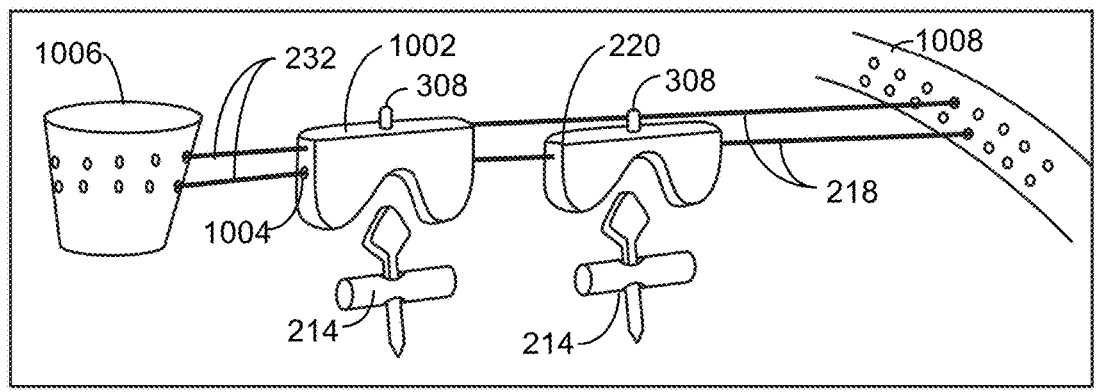
FIG. 10 is a detailed diagram of a pair of wedges and pegs.

FIG. 10 is a detailed diagram of a pair of wedges and pegs. The example device of FIG. 10 is generally referred to by the reference number 1000.

In the example device 1000, a wedge 1002 with a dual connection to two lines 218 is shown. One of the lines is fixed to wedge 1002 while the other line passes through a tunnel 1004 in wedge 1002 and is fixed to wedge 220. The wedges 1002, 220 both have a peg and skate combination 214 beneath them. The plurality of lines 218 with the attached wedges 220 and 1002 are shown extending from outer line ring 1006 to inner line ring 1008. The outer line ring 1006 and inner line ring 1008 both have two sets of holes for two sets of lines 218 to move freely through.

In the example of device 1000, the wedge 1002 with a tunnel 1004 enables multiple lines 218 to move independently within a same track (not shown). In some examples, the tunnel 1004 can prevent a line from colliding with an inline wedge 220. Any number of lines can be fit into a single tunnel 1004. For example, when the peg 304 of one of the peg and skate combinations 214 engages wedge 1002, wedge 220 may remain in its original position, without significant interaction between the two sets of wedges 220 and lines 218. Thus, the number of lines 218 can be a product of the device's 1000 perimeter and diameter, rather than being linearly related to the device's 1000 perimeter. With one skate per track, the number of end effectors is limited by the circumference of the device. Thus, by using shared peg and skate combinations 204 in each track, the two-dimensional surface of the example device 1000 can be used in a scalable manner.

The diagram of FIG. 10 is not intended to indicate that the example device 1000 is to include all of the components shown in FIG. 10. Rather, the example device 1000 can include fewer or additional components not illustrated in FIG. 10 (e.g., additional wedges 1002, tunnels 1004, lines 218, etc.).

Figure 11:
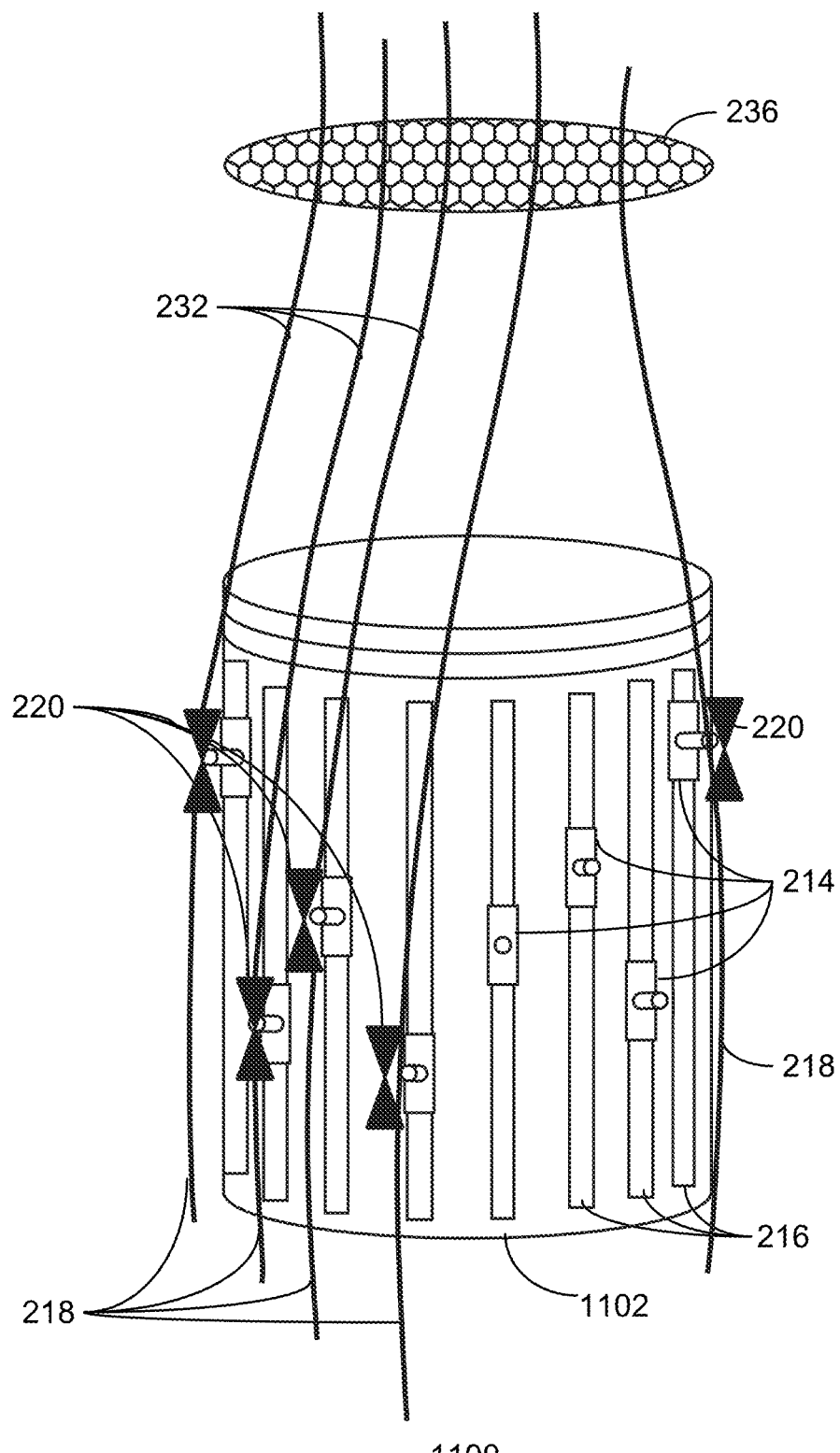
FIG. 11 is a diagram of an example drive using a cylinder with tracks.

FIG. 11 is a diagram of an example drive using a cylinder with tracks. The drive is generally referred to by the reference number 1100.

In the example drive 1100, the peg and skate combinations 214 are lined along skate tracks 216 in a cylinder 1102. A plurality of lines 218 with attached wedges 220 surround the cylinder 1102. The pegs of the peg and skate combinations 214 are oriented towards the center of the cylinder 1102 and towards the wedges 220 of lines 218. The load ends 232 of lines 218 are shown passing through a grid 236.

In example drive 1100, an inner cylinder (not shown) contains ramps (not shown) and electromagnets (not shown) to control the peg and skate combinations 214. In some examples, the cylinder can be any conical shape. The inner cylinder is rotated by the motor to cause the pegs and skates to be controlled by the ramps and electromagnets as discussed in FIG. 3 above. Furthermore, an additional outer cylinder (not shown) may include ramps and be used as a line brace similar to the use of line brace 226 of FIG. 2. The edges of the inner and outer cylinders (not shown) can also include toothed edges to engage a gear of the motor similar to the toothed edges of 204, 226 pictured in FIG. 2. The use of cylinders rather than disks for the control surface and line brace can enable smaller or differently shaped drives to be produced. In some examples, the smaller drives can be integrated into the objects that the smaller drives are to control. In addition, although the example device 1100 is cylindrical in shape, the same design can be applied to a conical, paraboloid, or any other radial shape. In some examples, the example device 1100 can include concentric gaps in an upper brace for increased scalability. For example, where a plurality of wedges that move along the same track are used, a plurality of concentric brace plates can be used in place of a single brace plate that covers the entire surface of the tracks. These concentric plates can be separated with a gap sufficient to allow lines to pass through the gaps, rather than traveling to the center of the brace plate. In this way, a plurality of wedges could follow the same radial line without colliding or running out of space toward the center.

The diagram of FIG. 11 is not intended to indicate that the example device 1100 is to include all of the components shown in FIG. 11. Rather, the example device 1100 can include fewer or additional components not illustrated in FIG. 11 (e.g., additional ramps, cylinders, skates 214, slots 216, lines 218, etc.).

Figure 12:
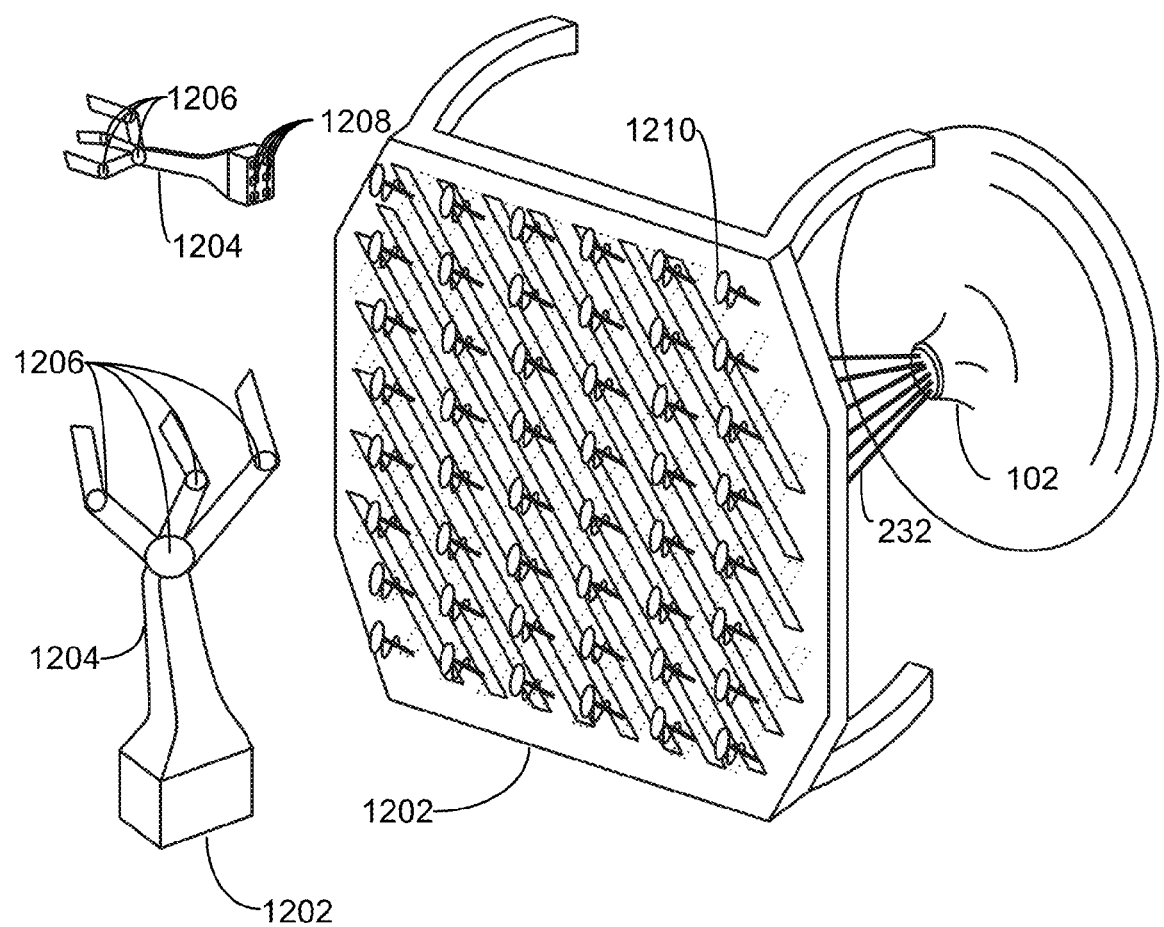
FIG. 12 is an example mechanical arm to be controlled according to embodiments described herein.

FIG. 12 is an example mechanical arm to be controlled according to embodiments described herein. The example mechanical arm system is generally referred to by the reference number 1200.

In the example system of 1200, a drive 102 is shown with lines 232 connected to a control grid 1202 with a plurality of beads 1210. The control grid 1202 is shown detached as well as attached to a mechanical arm 1204. The mechanical arm 1204 contains a plurality of joints 1206 and a plurality of holes 1208 at its base.

In the example of FIG. 12, the control grid 1202 can be coupled to the base of the mechanical arm 1204 via the holes 1208 of the base. For example, the mechanical arm 1204 may snap on to the beads 1210. In some examples, the mechanical arm 1204 may have a button enabling detachment from the control grid 1202. For example, the holes 1208 may match the number and configuration of beads 1210 and enable quick and easy coupling to control grid 1202 when properly aligned. Once the mechanical arm 1204 is mechanically coupled to the control grid 1202, the drive 102 can control movement at joints 1206 via the plurality of lines 232. Thus, fine motor movements can be accomplished and controlled using a single drive, rather than a plurality of smaller drives.

The diagram of FIG. 12 is not intended to indicate that the example device 1200 is to include all of the components shown in FIG. 12. Rather, the example device 1200 can include fewer or additional components not illustrated in FIG. 12 (e.g., additional ramps, cylinders, skates 214, slots 216, lines 218, etc.).

Figure 13:
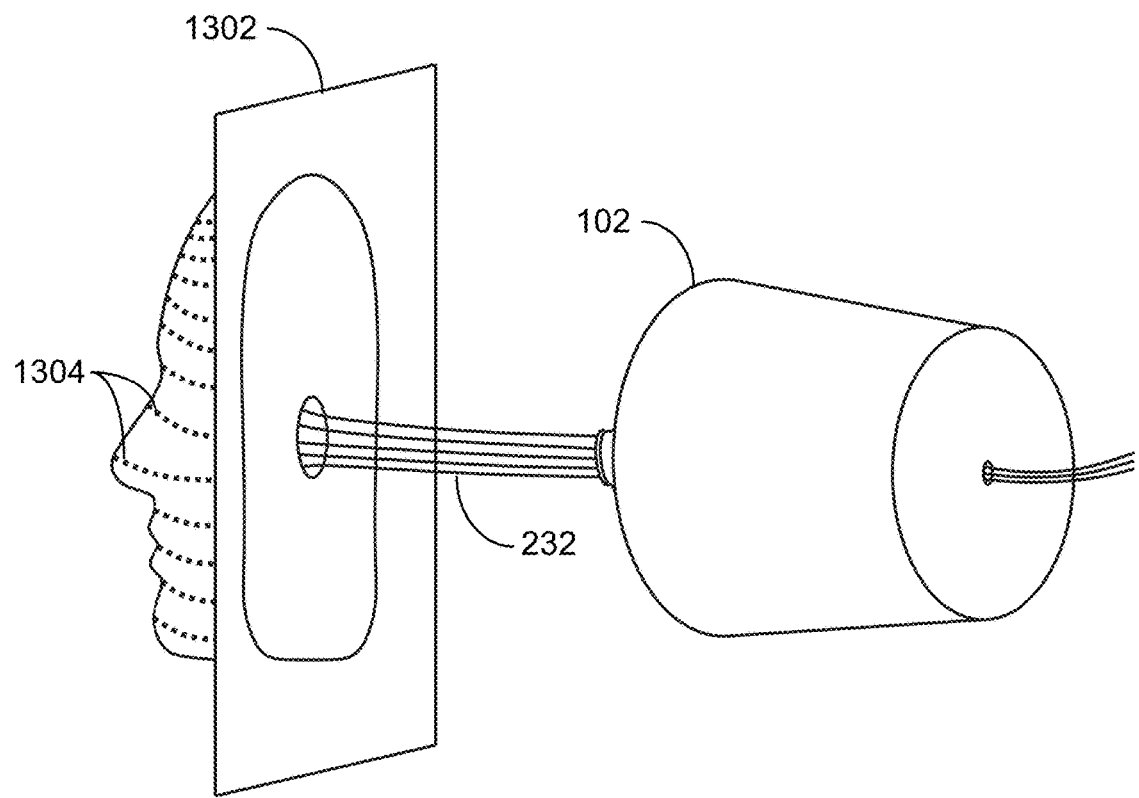
FIG. 13 is an example system controlling a three-dimensional object according to embodiments herein.

FIG. 13 is an example system controlling a three-dimensional object according to embodiments herein. The example system of FIG. 13 is generally referred to herein by the reference number 1300.

In the example system of 1300, a drive 102 is attached to a resilient material 1302 in the shape of a face via the load ends 232 of a plurality of lines. The surface of resilient material 1302 is in the form of a face and contains a plurality of adjustable end effectors 1304.

In the example of FIG. 13, the drive 102 is being used to move the end effectors 1304 under the surface of the resilient material 1302. For example, the resilient material 1302 can be made of foam or any other soft material capable of being transmuted from one form into another. The number of movable end effectors 1304 over a given portion of surface area of resilient material 1302 may be referred to as a resolution of control. In the example of FIG. 13, the resolution of control as indicated by the number of end effectors 1304 on the surface of resilient material 1302 can be any suitable number of end effectors per square foot. In some examples, the adjustable end effectors 1304 can be on the surface of the resilient material 1302.

The diagram of FIG. 13 is not intended to indicate that the example system 1300 is to include all of the components shown in FIG. 13. Rather, the example system 1300 can include fewer or additional components not illustrated in FIG. 13 (e.g., additional molds 1302, end effectors 1304, load ends 232, etc.).

Figure 14:
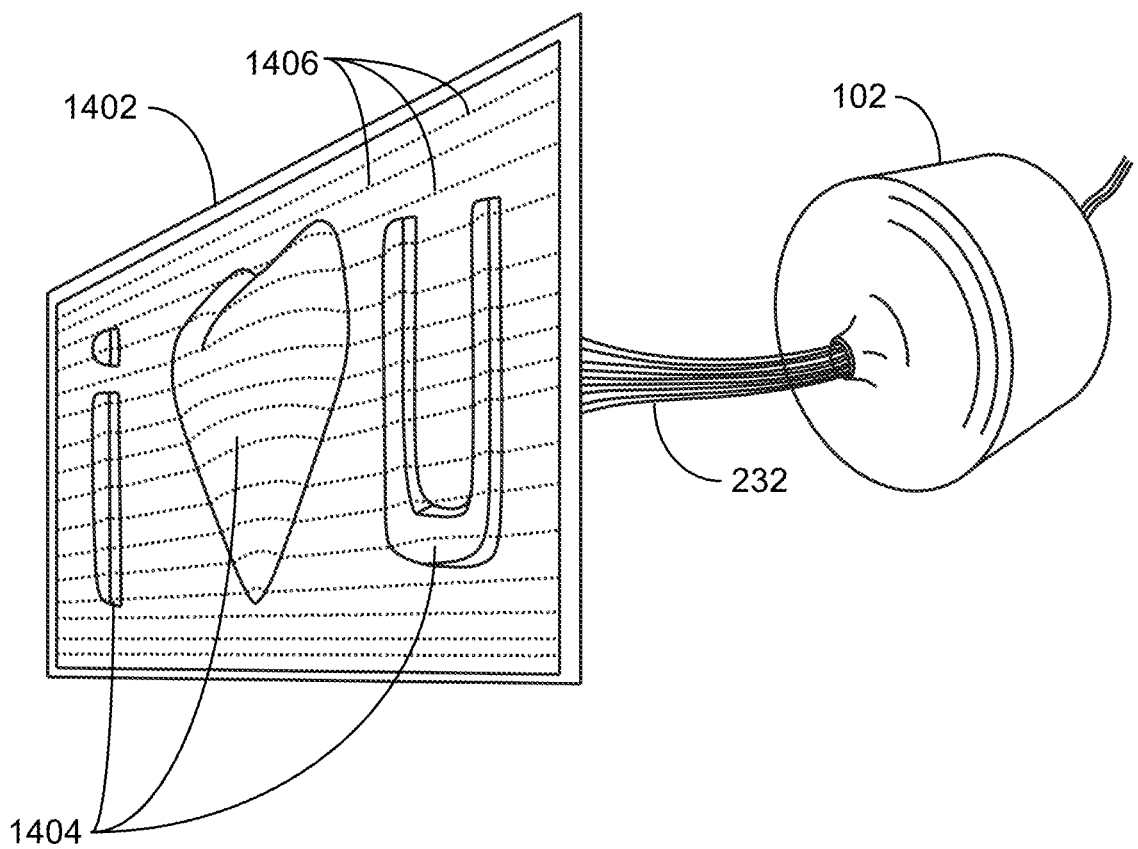
FIG. 14 is an example system controlling a tessellated topographical surface according to embodiments herein.

FIG. 14 is an example system controlling a tessellated topographical surface according to embodiments herein. The example system of FIG. 14 is generally referred to herein by the reference number 1400.

In the example system of 1400, a drive 102 is attached to tessellated topographical surface 1402 via lines 106. A plurality of tessellated pistons 1406 form patterns 1404 on the tessellated topographical surface 1402. In particular, the patterns 1404 include the letter "i," a heart shape, and the letter "u."

In the example of FIG. 14, the resolution of control of tessellated topographical surface 1402 is an order of magnitude greater than the example of FIG. 10. For example, the resolution may be any suitable number of times greater per area of measurement. Thus, the amount of lines 106 are also accordingly greater in number than in FIG. 10. In some examples, the lines 106 can be ultra-thin and made of suitable strong materials such as carbon-impregnated plastic or graphene, or the like. In some examples, the plurality of tessellated pistons 1406 can display a moving picture by continuously adjusting the patterns 1404 of the tessellated topographical surface 1402.

The diagram of FIG. 14 is not intended to indicate that the example system 1400 is to include all of the components shown in FIG. 14. Rather, the example system 1400 can include fewer or additional components not illustrated in FIG. 14 (e.g., additional tessellated topographical surface, 1402, patterns 1404, tessellated pistons 1406, load ends 232, etc.).

Figure 15:
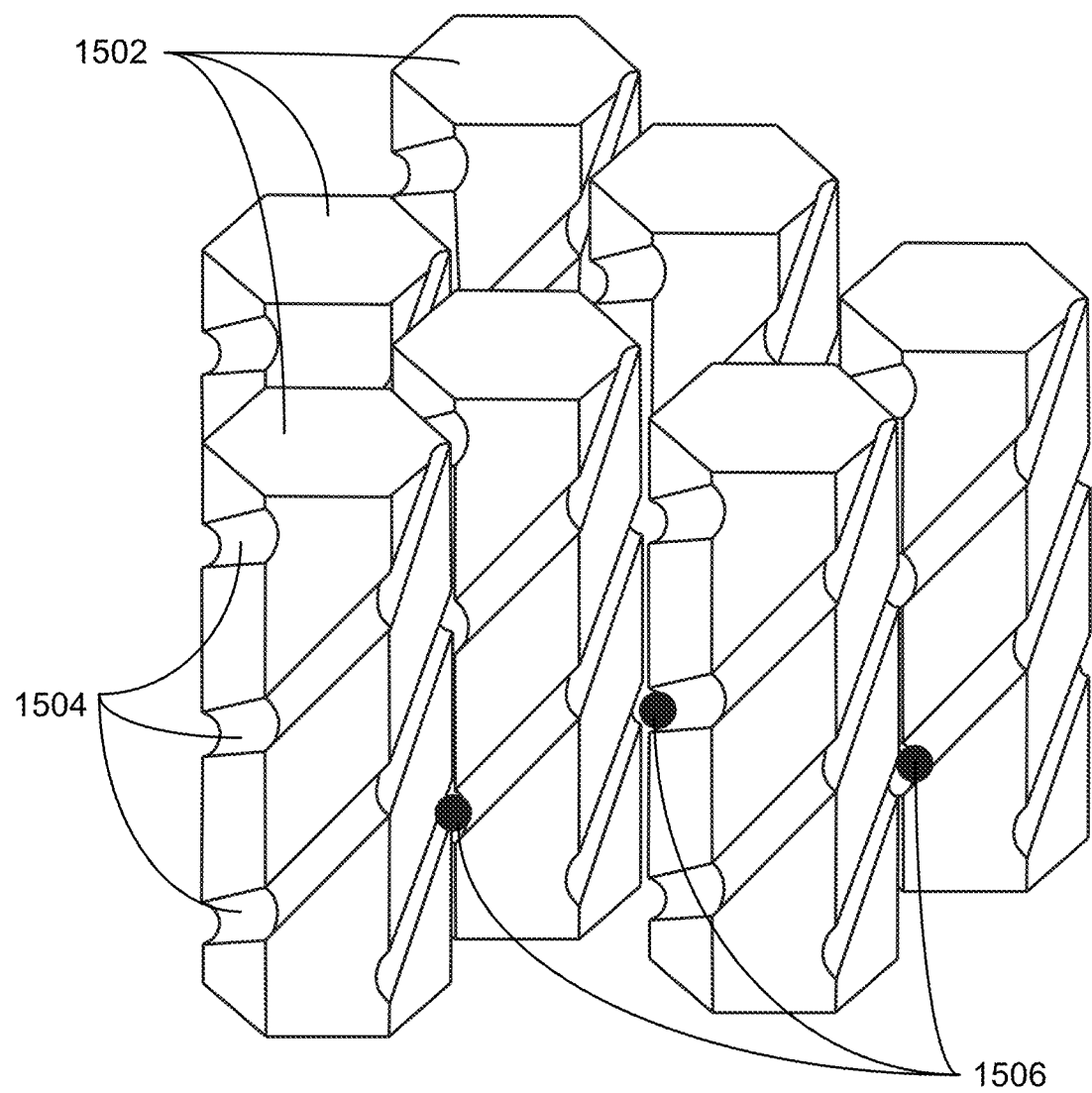
FIG. 15 is an example piston array controlled according to embodiments herein.

FIG. 15 is an example piston array controlled according to embodiments herein. The example piston array of FIG. 15 is generally referred to by the reference number 1500 and explained with reference to FIG. 1.

In the example piston array 1500 of FIG. 15, seven pistons 1502 having hexagonal cross sections are shown arranged flush with one another. Each piston 1502 contains a number of diagonal grooves 1504. Three objects 1506 are shown within intersections of grooves 1504 of two of the pistons 1502.

In the example of FIG. 15, each piston 1502 can be individually controllable by one of the lines 106 via the driver device 102 of FIG. 1. The movement of one piston 1502 can cause an object 1506 to move along intersections of the grooves between two of the pistons 1502. For example, the object can be a particle of material. As the movement of the pistons 1502 cause gaps creates by the intersection of the grooves 1504 to move, the particles can be moved in the moving gaps. In some examples, the pistons 1502 may have alternating patterns of grooves 1504. For example, some pistons can have grooves 1504 that are horizontal or vertical, while other pistons 1502 can have grooves 1504 that are diagonal. In some examples, a system using example pistons 1502 could separate the objects 1506 by shape, color, and/or other externally observed properties.

The diagram of FIG. 15 is not intended to indicate that the example system 1500 is to include all of the components shown in FIG. 15. Rather, the example system 1500 can include fewer or additional components not illustrated in FIG. 15 (e.g., additional pistons 1502, grooves 1504, particles 1506, etc.).

Example 1

This example provides for a system for controlling a plurality of lines. The system includes a control surface mechanically coupled to a motor, the control surface having at least one ramp and at least one movement source. The system also includes a control circuit operatively coupled to the at least one movement source. The system further includes a skate surface adjacent to the control surface, the skate surface having a plurality of linear tracks, each of the plurality of tracks having one or more skates disposed therein, the one or more skates disposed to move along an associated track when driven by the control signals, the pegs of the one or more skates to move perpendicular to the skate surface when pushed by the ramp. The system also includes a plurality of lines, each line tethered to one or more wedges, the pegs to cause one or more of the plurality of lines to move by engaging at least one wedge. Alternatively, or in addition, the system can include a sensor to monitor the position of the control surface relative to the skate surface. Alternatively, or in addition, the system can include a line brace to secure each line in place when not engaging the peg with the wedge. Alternatively, or in addition, the system can include a control circuit to alter the speed of the motor mechanically coupled to the control surface. Alternatively, or in addition, the at least one movement source can be arranged on the control surface, the control surface including a plurality of grooves that engage with a peg in each of a plurality of skates to hold the skates in position after the skates are positioned by an interaction with the at least one movement source based on the control signals. Alternatively, or in addition, the, the control surface and the skate surface can be adjacent plates, the plurality of tracks radially oriented towards the center of the skate surface. Alternatively, or in addition, the control surface, the skate surface, and the line brace comprising an inner cylinder and an outer cylinder, the inner cylinder to be located within the outer cylinder. Alternatively, or in addition, the control surface, the skate surface, and the line brace comprising radially symmetrical surfaces to be located adjacent to one another. Alternatively, or in addition, the lines can be further attached to one or more objects to be controlled. Alternatively, or in addition, the lines can be further attached to a grid, the grid to arrange the lines to be attached to a set of movable components of one or more objects to be controlled. Alternatively, or in addition, the lines are to remotely control the movable components of the one or more objects. Alternatively, or in addition, the object to be controlled can be a configurable three-dimensional surface including a plurality of end effectors coupled to the lines. Alternatively, or in addition, the objects to be controlled comprise one or more tessellated arrays of actuators. Alternatively, or in addition, the lines to be attached to a plurality of pistons having grooves for separating a plurality of objects by one or more observable properties.

Example 2

This example provides for a method for controlling a plurality of lines. The method can include receiving power at a motor to rotate a control surface and a line brace. Further the method can include receiving programmed movements at a control circuit. The method can also include receiving a controlled force based on the programmed movements to arrange one or more skates in a predetermined position along a skate track in a skate surface. The method can also include rotating the control surface to cause a peg ramp on the control surface to move a peg in the one or more skates towards a wedge fixed to a line. The method can further include causing the line to move to a new position along the direction of the skate track via a force of the peg against the wedge. Alternatively, or in addition, the method can include rotating the control disk to cause the peg ramp on the control surface to move the peg away from the wedge while a wedge secures the line in the new position via a coupling between the wedge and a groove in the line brace. The line one of a plurality of lines that can be attached to movable components of an object to be controlled by the control circuit based on the preprogrammed movements. The wedge can be one of a plurality of wedges. The skate can be one of a plurality of skates, and the peg can be one of a plurality of pegs in the plurality of skates. Alternatively, or in addition, the method can include receiving an additional controlled force based on the programmed movements to arrange the skate in a second predetermined position along the skate track in the skate surface and rotating the control surface to cause a second peg ramp to move the peg into the wedge and cause the line to move to a second new position. Alternatively, or in addition, the method can include receiving the controlled force comprising setting a voltage level or modulating electromagnetic pulses at a plurality of electromagnets wherein setting the voltage at the electromagnets causes a change in a magnetic field as the electromagnets pass under the skate. Alternatively, or in addition, the method can include measuring the position of the control surface relative to the skate surface using a sensor and adjusting the power of the motor, predicting the change in speed, or assuming speed to be constant, to keep an angular speed of the control surface and line brace constant. Alternatively, or in addition, the method can include measuring the position of the control surface relative to the skate surface using a sensor and adjusting the timing of the controlled movements to keep the effect of the controlled movements on the skates consistent. Alternatively, or in addition, the method can include rotating the line brace including the wedge ramp to secure the line in the new position via the coupling of the wedge with a groove in the line brace.

Example 3

This example provides for a device for controlling a plurality of lines. The device can include a control surface mechanically coupled to a motor, the control surface having at least one peg ramp and at least one movement source arranged thereon. The device can also include a control circuit operatively coupled to the at least one movement source, the control circuit to receive programmed movements and provide the control signals to the movement source and the motor. The device can also further include a skate surface adjacent to the control surface, the skate surface having a plurality of linear tracks, each of the plurality of tracks having one or more skates disposed therein, the one or more skates disposed to move along an associated track when driven by the control signals, the pegs of the one or more skates to move perpendicular to the skate surface when pushed by the peg ramp. The device can further include a plurality of lines, each line tethered to a wedge, the pegs to cause one or more of the plurality of lines to move by engaging at least one wedge. Alternatively, or in addition, the device can include a line brace to secure each line in place when not engaging the peg with the wedge. Alternatively, or in addition, the control surface, the line brace, and the skate surface can be adjacent plates, the plurality of tracks radially oriented towards the center of the skate surface, the line brace to engage each wedge via one of a plurality of concentric grooves on a bottom side of the line brace. Alternatively, or in addition, the control surface can include a plurality of grooves that engage with a peg in each of a plurality of skates to hold the skates in position after the skates are positioned by an interaction with the at least one movement source based on the control signals. Alternatively, or in addition, the line brace can engage or disengage each wedge via a wedge ramp on the line brace, the wedge ramp on the line brace to be aligned vertically with the peg ramp on the control surface. Alternatively, or in addition, the control surface, the skate surface, and a line brace comprising an inner cylinder and an outer cylinder, the inner cylinder to be located within the outer cylinder. Alternatively, or in addition, the control surface, skate surface, and the line brace comprising radially symmetrical surfaces to be located adjacent to one another. Alternatively, or in addition, the lines can be further attached to one or more objects to be controlled. Alternatively, or in addition, the plurality of lines further attached to a grid, the grid to arrange the plurality of lines, the plurality of lines to be coupled to a set of movable components of an object to be controlled. Alternatively, or in addition, the device can include an inner line ring and an outer line ring, the line rings to hold the plurality of lines in place in a radial direction, each line ring having a set of holes or slots for the plurality of lines to move through. Alternatively, or in addition, the at least one wedge comprising a wedge with a hole through which other lines can move without applying significant force on the wedge.

Example 4

This example provides for a system for controlling a plurality of lines. The system includes a means for controlling a surface mechanically coupled to a motor, the means for controlling a surface having at least one ramp and at least one movement source. For example, the means for controlling a surface can be a control surface. The system also includes a means for controlling a movement source operatively coupled to the at least one movement source. For example, the means for controlling the movement source can be a control circuit. The system further includes a means for guiding skates adjacent to the control surface, the means for guiding the skates having a plurality of linear tracks, each of the plurality of tracks having one or more skates disposed therein, the one or more skates disposed to move along an associated track when driven by the control signals, the pegs of the one or more skates to move perpendicular to the skate surface when pushed by the ramp. For example, the means for guiding the skates can be a skate surface. The system also includes a plurality of lines, each line tethered to one or more wedges, the pegs to cause one or more of the plurality of lines to move by engaging at least one wedge. Alternatively, or in addition, the system can include a means to monitor the position of the control surface relative to the skate surface. For example, the means for monitoring the position can be a sensor. Alternatively, or in addition, the system can include a means to secure each line in place when not engaging the peg with the wedge. For example, the means to search each line can be a line brace. Alternatively, or in addition, the system can include a means for altering the speed of the motor mechanically coupled to the control surface. For example, the means for altering the speed can be a control circuit. Alternatively, or in addition, the at least one movement source can be arranged on the control surface, the control surface including a plurality of grooves that engage with a peg in each of a plurality of skates to hold the skates in position after the skates are positioned by an interaction with the at least one movement source based on the control signals. Alternatively, or in addition, the, the control surface and the skate surface can be adjacent plates, the plurality of tracks radially oriented towards the center of the skate surface. Alternatively, or in addition, the control surface, the skate surface, and the line brace comprising an inner cylinder and an outer cylinder, the inner cylinder to be located within the outer cylinder. Alternatively, or in addition, the control surface, the skate surface, and the line brace comprising radially symmetrical surfaces to be located adjacent to one another. Alternatively, or in addition, the lines can be further attached to one or more objects to be controlled. Alternatively, or in addition, the lines can be further attached to a grid, the grid to arrange the lines to be attached to a set of movable components of one or more objects to be controlled. Alternatively, or in addition, the lines are to remotely control the movable components of the one or more objects. Alternatively, or in addition, the object to be controlled can be a configurable three-dimensional surface including a plurality of end effectors coupled to the lines. Alternatively, or in addition, the objects to be controlled comprise one or more tessellated arrays of actuators. Alternatively, or in addition, the lines to be attached to a plurality of pistons having grooves for separating a plurality of objects by one or more observable properties.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for controlling a plurality of lines, comprising:
    a control surface mechanically coupled to a motor, the control surface having at least one ramp and at least one movement source;
    a control circuit operatively coupled to the at least one movement source;
    a skate surface adjacent to the control surface, the skate surface having a plurality of linear tracks, each of the plurality of tracks having one or more skates disposed therein, the one or more skates disposed to move along an associated track when driven by the control signals, the pegs of the one or more skates to move perpendicular to the skate surface when pushed by the ramp; and
    a plurality of lines, each line tethered to one or more wedges, the pegs to cause one or more of the plurality of lines to move by engaging at least one wedge.

2. The system of claim 1, further comprising a sensor to monitor the position of the control surface relative to the skate surface.

3. The system of claim 1, further comprising a line brace to secure each line in place when not engaging the peg with the wedge.

4. The system of claim 1, further comprising a control circuit to alter the speed of the motor mechanically coupled to the control surface.

5. The system of claim 1, the at least one movement source to be arranged on the control surface, the control surface including a plurality of grooves that engage with a peg in each of a plurality of skates to hold the skates in position after the skates are positioned by an interaction with the at least one movement source based on the control signals.

6. The system of claim 1, the control surface and the skate surface comprising adjacent plates, the plurality of tracks radially oriented towards the center of the skate surface.

7. The system of claim 1, the control surface, the skate surface, and the line brace comprising an inner cylinder and an outer cylinder, the inner cylinder to be located within the outer cylinder.

8. The system of claim 1, the control surface, the skate surface, and the line brace comprising radially symmetrical surfaces to be located adjacent to one another.

9. The system of claim 1, the lines further attached to one or more objects to be controlled.

10. The system of claim 9, wherein the lines are to remotely control the movable components of the one or more objects.

11. The system of claim 9, wherein the object to be controlled comprises a configurable three-dimensional surface including a plurality of end effectors coupled to the lines.

12. The system of claim 9, wherein the objects to be controlled comprise one or more tessellated arrays of actuators.

13. The system of claim 1, the lines further attached to a grid, the grid to arrange the lines to be attached to a set of movable components of one or more objects to be controlled.

14. The system of claim 1, the lines to be attached to a plurality of pistons having cavities for separating a plurality of objects by one or more observable properties.

15. A method for controlling a plurality of lines, comprising:
    receiving power at a motor to rotate a control surface and a line brace;
    receiving programmed movements at a control circuit;
    receiving a controlled force based on the programmed movements to arrange one or more skates in a predetermined position along a skate track in a skate surface;
    rotating the control surface to cause a peg ramp on the control surface to move a peg in the one or more skates towards a wedge fixed to a line; and
    causing the line to move to a new position along the direction of the skate track via a force of the peg against the wedge.

16. The method of claim 15, further comprising rotating the control disk to cause the peg ramp on the control surface to move the peg away from the wedge while a wedge secures the line in the new position via a coupling between the wedge and a groove in the line brace, the line one of the plurality of lines attached to movable components of an object to be controlled by the control circuit based on the preprogrammed movements, the wedge one of a plurality of wedges, the skate one of a plurality of skates, and the peg one of a plurality of pegs in the plurality of skates.

17. The method of claim 16, further comprising receiving an additional controlled force based on the programmed movements to arrange the skate in a second predetermined position along the skate track in the skate surface and rotating the control surface to cause a second peg ramp to move the peg into the wedge and cause the line to move to a second new position.

18. The method of claim 15, receiving the controlled force comprising setting a voltage level or modulating electromagnetic pulses at a plurality of electromagnets wherein setting the voltage at the electromagnets causes a change in a magnetic field as the electromagnets pass under the skate.

19. The method of claim 15, further comprising measuring the position of the control surface relative to the skate surface using a sensor and adjusting the power of the motor, predicting the change in speed, or assuming speed to be constant, to keep an angular speed of the control surface and line brace constant.

20. The method of claim 15, further comprising measuring the position of the control surface relative to the skate surface using a sensor and adjusting the timing of the controlled movements to keep the effect of the controlled movements on the skates consistent.

21. The method of claim 15, further comprising rotating the line brace including the wedge ramp to secure the line in the new position via the coupling of the wedge with a groove in the line brace.

22. A device for controlling a plurality of lines, comprising:
a control surface mechanically coupled to a motor, the control surface having at least one peg ramp and at least one movement source arranged thereon;
a control circuit operatively coupled to the at least one movement source, the control circuit to receive programmed movements and provide the control signals to the movement source and the motor;
a skate surface adjacent to the control surface, the skate surface having a plurality of linear tracks, each of the plurality of tracks having one or more skates disposed therein, the one or more skates disposed to move along an associated track when driven by the control signals, the pegs of the one or more skates to move perpendicular to the skate surface when pushed by the peg ramp; and
a plurality of lines, each line tethered to a wedge, the pegs to cause one or more of the plurality of lines to move by engaging at least one wedge.

23. The device of claim 22, further comprising a line brace to secure each line in place when not engaging the peg with the wedge, the control surface, the line brace, and the skate surface comprising adjacent plates, the plurality of tracks radially oriented towards the center of the skate surface, the line brace to engage each wedge via one of a plurality of concentric grooves on a bottom side of the line brace, the control surface including a plurality of grooves that engage with a peg in each of a plurality of skates to hold the skates in position after the skates are positioned by an interaction with the at least one movement source based on the control signals.

24. The device of claim 23, the line brace to engage or disengage each wedge via a wedge ramp on the line brace, the wedge ramp on the line brace to be aligned vertically with the peg ramp on the control surface.

25. The device of claim 23, the control surface, skate surface, and the line brace comprising radially symmetrical surfaces to be located adjacent to one another.

26. The device of claim 22, the control surface, the skate surface, and a line brace comprising an inner cylinder and an outer cylinder, the inner cylinder to be located within the outer cylinder.

27. The device of claim 22, the lines further attached to one or more objects to be controlled.

28. The device of claim 22, the plurality of lines further attached to a grid, the grid to arrange the plurality of lines, the plurality of lines to be coupled to a set of movable components of an object to be controlled.

29. The device of claim 22, further comprising an inner line ring and an outer line ring, the line rings to hold the plurality of lines in place in a radial direction, each line ring having a set of holes or slots for the plurality of lines to move through.

30. The device of claim 22, the at least one wedge comprising a wedge with a hole through which other lines can move without applying significant force on the wedge.

* * * * *